United States Patent
Qi et al.

(10) Patent No.: US 11,009,601 B2
(45) Date of Patent: May 18, 2021

(54) MONITORING METHOD, MONITORING SYSTEM AND CONTROL DEVICE FOR HUMAN-BODY SECURITY-INSPECTION DEVICE

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Rong Wang, Shenzhen (CN); Xiongwei Huang, Shenzhen (CN); Chao Sun, Shenzhen (CN); Xiaoxiang Hou, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 421 days.

(21) Appl. No.: 16/032,086

(22) Filed: Jul. 11, 2018

(65) Prior Publication Data
US 2018/0321376 A1 Nov. 8, 2018

Related U.S. Application Data

(63) Continuation of application No. PCT/CN2017/084704, filed on May 17, 2017.

(30) Foreign Application Priority Data

Jun. 29, 2016 (CN) .......................... 201610497276.4

(51) Int. Cl.
*G01S 13/89* (2006.01)
*G01S 13/87* (2006.01)
(Continued)

(52) U.S. Cl.
CPC ............ *G01S 13/89* (2013.01); *G01N 29/069* (2013.01); *G01S 7/412* (2013.01); *G01S 13/04* (2013.01);
(Continued)

(58) Field of Classification Search
CPC ....... G01N 29/069; G01S 13/04; G01S 13/87; G01S 13/887; G01S 13/89; G01S 7/412; G01V 8/005
See application file for complete search history.

(56) References Cited

U.S. PATENT DOCUMENTS 6,791,487 B1 9/2004 Singh
7,249,284 B2 7/2007 Shah
(Continued)

FOREIGN PATENT DOCUMENTS

CN 201583509 U 9/2010
CN 102393536 A 3/2012
(Continued)

OTHER PUBLICATIONS

Hua Yang, Jing Xiao, Taibo Chen et al, Equipment failure and diagnosis, Equipment integrated management, Aug. 2014, pp. 111-112, chapter 7, Mechanical Industry Press, China.
(Continued)

*Primary Examiner* — Michael J Dalbo (57) ABSTRACT

The present disclosure relates to a monitoring method, a monitoring system and a control device for a human-body security-inspection device. The monitoring method includes: collecting operation parameters of preset monitoring points in target circuit modules of the human-body security-inspection device; obtaining parameter ranges according to module identifiers of the target circuit modules and monitoring-point identifiers of the preset monitoring points, wherein the parameter ranges are associated with the
(Continued)

module identifiers and the monitoring-point identifiers respectively; determining whether the operation parameters are in the parameter ranges respectively, and then determining location information of a fault point according to the module identifiers and the monitoring-point identifiers if any of the operation parameters is not in a corresponding parameter range. Therefore, the present disclosure can quickly locate the position of the fault point, thus it is convenient in the maintenance and test work, and improve the efficiency of the maintenance and test work.

8 Claims, 8 Drawing Sheets (51) Int. Cl.
    *G01N 29/06*     (2006.01)
    *G01S 7/41*     (2006.01)
    *G01S 13/04*     (2006.01)
    *G01S 13/88*     (2006.01)
    *G01V 8/00*     (2006.01)

(52) U.S. Cl.
    CPC .............. *G01S 13/87* (2013.01); *G01S 13/887* (2013.01); *G01V 8/005* (2013.01)

(56) References Cited

U.S. PATENT DOCUMENTS

| | | | |
|---|---|---|---|
| 7,885,384 B2 | 2/2011 | Mannar | |
| 7,889,113 B2 | 2/2011 | Cardiasmenos | |
| 8,766,784 B2 | 7/2014 | Rayner | |
| 2011/0227723 A1* | 9/2011 | Dewey | G08B 25/10 340/539.11 |
| 2013/0328697 A1* | 12/2013 | Lundy | G08B 21/02 340/870.16 |
| 2014/0070743 A1* | 3/2014 | Yoshida | H02P 6/24 318/400.22 |
| 2015/0048253 A1* | 2/2015 | Wu | G01S 13/887 250/393 |

FOREIGN PATENT DOCUMENTS

| | | |
|---|---|---|
| CN | 102419560 A | 4/2012 |
| CN | 102426361 A | 4/2012 |
| CN | 102508240 A | 6/2012 |
| CN | 102654584 A | 9/2012 |
| CN | 103198542 A | 7/2013 |
| CN | 104793252 A | 7/2015 |
| CN | 204666826 U | 9/2015 |
| CN | 105371893 A | 3/2016 |
| CN | 105607056 A | 5/2016 |
| CN | 105652857 A | 6/2016 |
| CN | 105699494 A | 6/2016 |
| CN | 106405680 A | 2/2017 |
| JP | 2010231658 A | 10/2010 |

OTHER PUBLICATIONS

Mechanical (power) division manual: editorial board. Mechanical (power) division manual, May 31, 1997, pp. 874-875,• mechanical industry press, Beijing, China.

Lina Sun,etc.al, Design of an intelligent control and diagnosis system for X-ray security inspection equipment, Jan. 2007, vol. 28, No. 1, Chinese Journal of Scientific Instrument, China.

Hu Yang , Based on embedded millimeter waveSource imaging system display control terminal IPlan and implement, Mar. 15, 2016, pp. 64-65, and 74-76, Excellent master's thesis of China.

* cited by examiner

MONITORING METHOD, MONITORING SYSTEM AND CONTROL DEVICE FOR HUMAN-BODY SECURITY-INSPECTION DEVICE

TECHNICAL FIELD

Embodiments of the present disclosure generally relate to the security-inspection technology, and in particular relate to a monitoring method, a monitoring system and a control device for a human-body security-inspection device.

BACKGROUND

The millimeter wave is a wave with a frequency in a range from 30 GHz to 300 GHz (which has a wavelength in a range from 1 mm to 10 mm). In the practical engineering application, the low frequency of the millimeter wave is generally reduced to 26 GHz. In the electromagnetic spectrum, the frequency of the millimeter wave is between the frequency of the infrared and the frequency of the microwave. In comparison with the infrared, the millimeter wave has the capability of working in all weathers and can be used in the severe environment, such as smoke dust, cloud and mist, etc. In comparison with the microwave, the millimeter wave has the typical advantages of shorter wavelength, wider bandwidth (able to be used widely), and the property of propagating in the atmosphere. In detail, the millimeter wave mainly has the following characteristics: 1. the millimeter wave is with high precision, the millimeter-wave radar is easier to obtain a narrow beam and a large absolute bandwidth, and the millimeter-wave radar system is more resistant to the electronic interference; 2. in the Doppler radar, the millimeter wave has a high Doppler frequency resolution: 3. in the millimeter-wave imaging system, the millimeter wave is sensitive to the shape and the structure of the target object, and has an excellent capability to distinguish metal objects from the background environment, and can achieve images with high resolutions so as to improve the capability of recognizing and detecting the target object; 4. the millimeter wave can penetrate the plasma; 5. in comparison with the infrared laser, the millimeter wave is less affected by the severe natural environments: 6. the millimeter-wave system is small in size and light in weight, and the millimeter-wave circuit is much smaller in size in comparison with the microwave circuit, thereby the millimeter-wave system is easier to be integrated. These unique characteristics make the millimeter wave able to be used widely in various application fields, especially in the non-destructive testing field and the security-inspection field.

The millimeter-wave imaging technology is mainly divided into the active millimeter-wave imaging technology and the passive millimeter-wave imaging technology. The passive millimeter-wave imaging system is advantageous in simple structure and low cost, but is disadvantageous in long imaging time and poor imaging resolution. With the improvement of the millimeter-wave component and the development of the millimeter-wave component technology, the active millimeter-wave imaging technology has begun to attract more and more attentions. The active millimeter-wave imaging technology mainly adopts the active synthetic-aperture imaging technology or the active holographic-imaging technology. The millimeter-wave holographic imaging method is a method derived from the optical holography method. The millimeter-wave holographic imaging method is based on the electromagnetic-wave coherence principle, in which a transmitter emits a highly-stable millimeter-wave signal firstly, then a receiver receives an echo signal reflected by a corresponding one of points of the target object, and performs a coherent process for the echo signal with a highly-coherent reference signal, to extract information of amplitude and phase of the echo signal, such that to obtain the emission characteristic at the target point, and eventually a millimeter-wave image of the target object in the scene may be obtained via a data and image processing method. The millimeter-wave image obtained by the active millimeter-wave holographic-imaging technology has good resolution, and the millimeter-wave holographic-imaging technology may cooperate with the mechanical scanning technology, to greatly shorten the imaging time thereof, and be executed by practice of engineering, thus the millimeter-wave holographic-imaging technology is very suitable for the active millimeter-wave short-range imaging technology.

The current three-dimensional holographic imaging technology on the international are mostly adopting the active millimeter-wave cylindrical array rotary-scanning technology, that is, it adopts millimeter-wave transmitting/receiving antenna modules, which are arranged in an array, to obtain the body scanning information. However, it has too many circuits, such as the receive/transmit antenna modules and the related circuits, and even more than 60 circuit boards. When controlling the human-body security-inspection device, after an upper computer transmits a control signal, it is hard to monitor whether or not each module receives a corresponding control signal or wherein or not each functional module is normal, and can not constantly monitor the working status of each circuit module. Once the human-body security-inspection device breaks down, it needs a very complicated work to repair and test the device, thus it is very inconvenient to maintain, repair and debug the human-body security-inspection device.

SUMMARY

The present disclosure is to provide a monitoring method, a monitoring system and a control device for a human-body security-inspection device, to quickly locate a position of a fault point when the human-body security-inspection device breaks down, thus improving the efficiency of maintenance and test.

The present disclosure is achieved through following technical solutions.

A monitoring method for a human-body security-inspection device, including:

collecting operation parameters of preset monitoring points in target circuit modules of the human-body security-inspection device:

obtaining parameter ranges according to module identifiers of the target circuit modules and monitoring-point identifiers of the preset monitoring points, wherein the parameter ranges are associated with the module identifiers and the monitoring-point identifiers respectively; and determining whether the operation parameters are in the parameter ranges respectively, and then determining location information of a fault point according to the module identifiers and the monitoring-point identifiers if any of the operation parameters is not in a corresponding parameter range.

A monitoring system for a human-body security-inspection device, including:

a data-collecting unit, configured to collect operation parameters of preset monitoring points in target circuit modules of the human-body security-inspection device:

a data-processing unit, configured to obtain parameter ranges according to module identifiers of the target circuit modules and monitoring-point identifiers of the preset monitoring points, wherein the parameter ranges are associated with the module identifiers and the monitoring-point identifiers respectively; and a fault-point position determining unit, configured to determining whether the operation parameters are in the parameter ranges respectively, and then determining location information of a fault point according to the module identifiers and the monitoring-point identifiers if any of the operation parameters is not in a corresponding parameter range.

A control device for a human-body security-inspection device, including: a first millimeter-wave receiving and transmitting control module, a second millimeter-wave receiving and transmitting control module, a motion module and an upper computer, wherein the control device further comprises a monitoring module, the upper computer is connected to the first millimeter-wave receiving and transmitting control module, the second millimeter-wave receiving and transmitting control module, the motion module and the monitoring module respectively, and the monitoring module is further connected to the first millimeter-wave receiving and transmitting control module, the second millimeter-wave receiving and transmitting module and the motion module respectively; and the monitoring module is configured to, after the first millimeter-wave receiving and transmitting control module, the second millimeter-wave receiving and transmitting control module and the motion module receiving control signals sent from the upper computer, respectively collect operation parameters of preset monitoring points in the first millimeter-wave receiving and transmitting control module, the second millimeter-wave receiving and transmitting control module and the motion module; respectively obtain parameter ranges associated with a module identifier of the first millimeter-wave receiving and transmitting control module and monitoring-point identifiers of the preset monitoring points of the first millimeter-wave receiving and transmitting control module, parameter ranges associated with a module identifier of the second millimeter-wave receiving and transmitting control module and monitoring-point identifiers of the preset monitoring points of the second millimeter-wave receiving and transmitting control module, parameter ranges associated with a module identifier of the motion module and monitoring-point identifiers of the preset monitoring points of the motion module; and respectively determine whether each of the operation parameters is in a corresponding parameter range, and then determine location information of a fault point according to the module identifiers and the monitoring-point identifiers if any of the operation parameters is not in a corresponding parameter range.

The above-mentioned solutions of the present disclosure, collects the operation parameters of the preset monitoring points in the target circuit modules of the human-body security-inspection device; obtains the parameter ranges according to module identifiers of the target circuit modules and monitoring-point identifiers of the preset monitoring points, wherein the parameter ranges are associated with the module identifiers and the monitoring-point identifiers respectively; and determines whether the operation parameters are in the parameter ranges respectively, and then determining location information of a fault point according to the module identifiers and the monitoring-point identifiers if any of the operation parameters is not in a corresponding parameter range. Thus, the present disclosure may constantly collect the operation parameters of the preset monitoring points in the target circuit modules, obtain the parameter ranges associated with the module identifiers of the target circuit modules and the monitoring-point identifiers of the preset monitoring points according to the module identifiers of the target circuit modules and the monitoring-point identifiers of the preset monitoring points, and determine the location information of the fault point according to the module identifiers and the monitoring-point identifiers if any of the operation parameters is not in the corresponding parameter range. Since the location point of the fault point is determined according to the module identifiers and the monitoring-point identifiers, thus the present disclosure may quickly locate which one of the monitoring points and which one of the circuit modules breaks down when the security-inspection device is not normally working, that is, it may quickly locate the position of the fault point, thus it is convenient in the maintenance and test work, and improve the efficiency of the maintenance and test work. Furthermore, the control device for the human-body security-inspection of the present disclosure may closed-cycle control the security-inspection device.

BRIEF DESCRIPTION OF THE DRAWINGS

In order to more clearly illustrate the technical solution in the embodiments of the present disclosure, the accompanying drawings to be used in the description of the embodiments are briefly described below. It will be apparent that the accompanying drawings in the following description are merely embodiments of the present disclosure, other accompanying drawings may be obtained without creative work for those skilled in the art.

DETAILED DESCRIPTION

The technical solution of the embodiments of the present disclosure will be described more clearly and completely with reference to the accompanying drawings. Apparently, the embodiments described here only some exemplary embodiments, not all the embodiments. Based on the embodiments described in the present disclosure, one skilled in the art may acquire all other embodiments without any creative work. All these shall be covered within the protection scope of the present disclosure.

Embodiment 1

Figure 1:
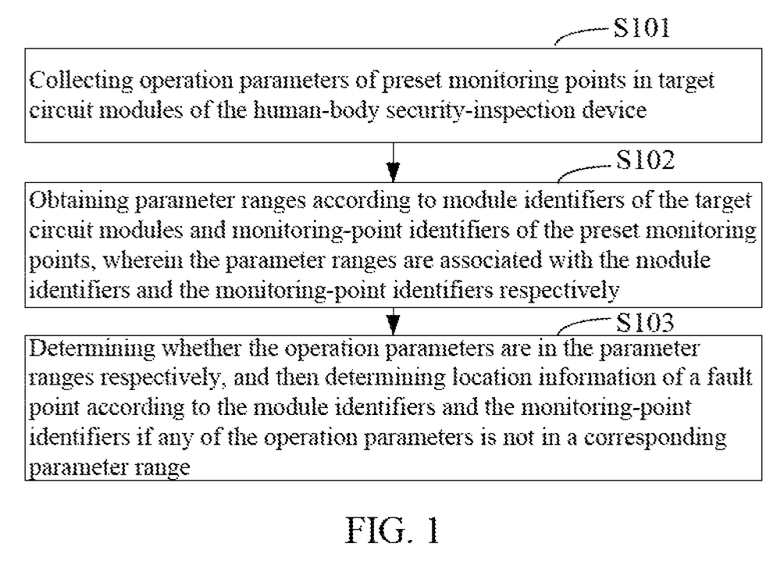
FIG. 1 is a flow chart of a monitoring method for a human-body security-inspection device according to a first embodiment of the present disclosure.

Referring to FIG. 1, a flow chart of a monitoring method for a human-body security-inspection device according to a first embodiment of the present disclosure is depicted. The method may include the following blocks.

At S101: collecting operation parameters of preset monitoring points in target circuit modules of the human-body security-inspection device.

In this embodiment, the operation parameters may be digital signals, analog signals and/or power-supply voltages.

At S102: obtaining parameter ranges according to module identifiers of the target circuit modules and monitoring-point identifiers of the preset monitoring points, wherein the parameter ranges are associated with the module identifiers and the monitoring-point identifiers respectively.

In this embodiment, the parameter ranges may be set in advance according to the actual needs, and may be set to be greater than set thresholds, smaller than set thresholds, or within preset ranges, respectively. The parameter ranges of the different preset monitoring points in the different target circuit modules may be different with each other, and each of the parameter ranges represents a parameter range of a corresponding preset monitoring point in the normal work.

Specifically, it may firstly determine the module identifier of each of the target circuit module and the monitoring-point identifier of each of the preset monitoring points, and then look up the parameter range corresponding to the determined module identifier and the determined monitoring-point identifier.

In this embodiment, it may pre-build the incidence relation among the module identifiers, the monitoring-point identifiers and the parameter ranges, and look up a parameter range corresponding to the determined module identifier and the determined monitoring-point identifier according to the incidence relation after determine the module identifier and the monitoring-point identifier.

Table 1 shows an incidence relation among the module identifiers, the monitoring-point identifiers and the parameter ranges. In a specific implementation, the incidence relationship among the module identifiers, the monitoring-point identifiers and the parameter ranges may be established according to the actual needs.

TABLE 1 an incidence relation among module identifiers, monitoring-point identifiers and parameter ranges

| SN | Module Identifier | Monitoring Point Identifier | Parameter Range |
|---|---|---|---|
| 1 | Module 1 | Monitoring Point A | Parameter Range 1 |
| 2 | Module 1 | Monitoring Point B | Parameter Range 2 |
| 3 | Module 1 | Monitoring Point C | Parameter Range 3 |
| 4 | Module 1 | Monitoring Point D | Parameter Range 4 |
| 5 | Module 2 | Monitoring Point A | Parameter Range 5 |
| 6 | Module 2 | Monitoring Point B | Parameter Range 6 |
| 7 | Module 2 | Monitoring Point C | Parameter Range 7 |
| 8 | Module 3 | Monitoring Point A | Parameter Range 8 |
| 9 | Module 3 | Monitoring Point B | Parameter Range 9 |
| 10 | Module 4 | Monitoring Point A | Parameter Range 10 |
| 11 | Module 4 | Monitoring Point B | Parameter Range 11 |

At S103: determining whether the operation parameters are in the parameter range, and then determining location information of a fault point according to the module identifiers and the monitoring-point identifiers if any of the operation parameters is not in a corresponding parameter range.

The present embodiment collects the operation parameters of the preset monitoring points in the target circuit modules of the human-body security-inspection device; obtains the parameter ranges according to module identifiers of the target circuit modules and monitoring-point identifiers of the preset monitoring points, wherein the parameter ranges are associated with the module identifiers and the monitoring-point identifiers respectively; and determines whether the operation parameters are in the parameter ranges respectively, and then determining location information of a fault point according to the module identifiers and the monitoring-point identifiers if any of the operation parameters is not in a corresponding parameter range. Thus, the present embodiment may constantly collects the operation parameters of the preset monitoring points in the target circuit modules, obtains the parameter ranges associated with the module identifiers of the target circuit modules and the monitoring-point identifiers of the preset monitoring points according to the module identifiers of the target circuit modules and the monitoring-point identifiers of the preset monitoring points, and determines the location information of the fault point according to the module identifiers and the monitoring-point identifiers if any of the operation parameters is not in the corresponding parameter range. Since the location point of the fault point is determined according to the module identifiers and the monitoring-point identifiers, thus the present disclosure may quickly locate which one of the monitoring points and which one of the circuit modules breaks down when the security-inspection device is not normally working, that is, it may quickly locate the position of the fault point, thus it is convenient in the maintenance and test work, and improve the efficiency of the maintenance and test work.

In one embodiment, the target circuit modules may include a first millimeter-wave receiving and transmitting control module, a second millimeter-wave receiving and transmitting control module, and a motion module.

In one embodiment, the operation parameters may include at least one of DC (direct-current) power-supply voltage, communication data, transmission frequencies, transmission powers, receiving frequencies, and receiving powers of the preset monitoring points in the first millimeter-wave receiving and transmitting control module and the second millimeter-wave receiving and transmitting control module, and may further include at least one of movement states, movement directions, movement velocities, movement angles, and extreme positions of the preset monitoring points in the motion module.

In one embodiment, the target circuit modules may further include a power-supply module, and the operation parameters may further include DC voltages of the preset monitoring points in the power-supply module.

In addition, in order to facilitate the user to view the location information of the fault point, in one embodiment, the monitoring method for the human-body security-inspection device of the present disclosure may further include: uploading the location information of the fault point to an upper computer for displaying.

Embodiment 2

Figure 2:
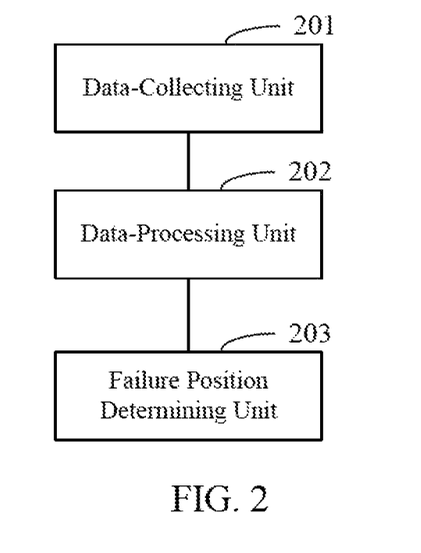
FIG. 2 is a schematic view of a monitoring system for a human-body security-inspection device according to a second embodiment of the present disclosure.

Based on the above-mentioned first embodiment, the present disclosure further provides a monitoring system for a human-body security-inspection device in accordance with a second embodiment thereof. Referring to FIG. 2, a schematic view of the monitoring system for the human-body security-inspection device according to the second embodiment of the present disclosure is depicted. As shown in FIG. 2, the monitoring system for the human-body security-inspection device of this embodiment includes a data-collecting unit 201, a data-processing unit 202, and a fault-point position determining unit 203.

The data-collecting unit 201 is configured to collect operation parameters of preset monitoring points in target circuit modules of the human-body security-inspection device.

The data-processing unit 202 is configured to obtain parameter ranges according to module identifiers of the target circuit modules and monitoring-point identifiers of the preset monitoring points, wherein the parameter ranges are associated with the module identifiers and the monitoring-point identifiers respectively.

The fault-point position determining unit 203 is configured to determine whether the operation parameters are in the parameter ranges respectively, and then determine location information of a fault point according to the module identifiers and the monitoring-point identifiers if any of the operation parameters is not in a corresponding parameter range.

In the monitoring system for the human-body security-inspection device of the present embodiment, it should be noted that, the above description of the monitoring system for the human-body security-inspection device is similar with that of the monitoring method for the human-body security-inspection device, thus it has the advantages same to those of the monitoring method, which will not be described herein to save space. Therefore, some technical details related to the monitoring system for the human-body security-inspection device of the present embodiment which are not disclosed, may be referred by the above description of the monitoring method for the human-body security-inspection device.

Embodiment 3

Figure 3:
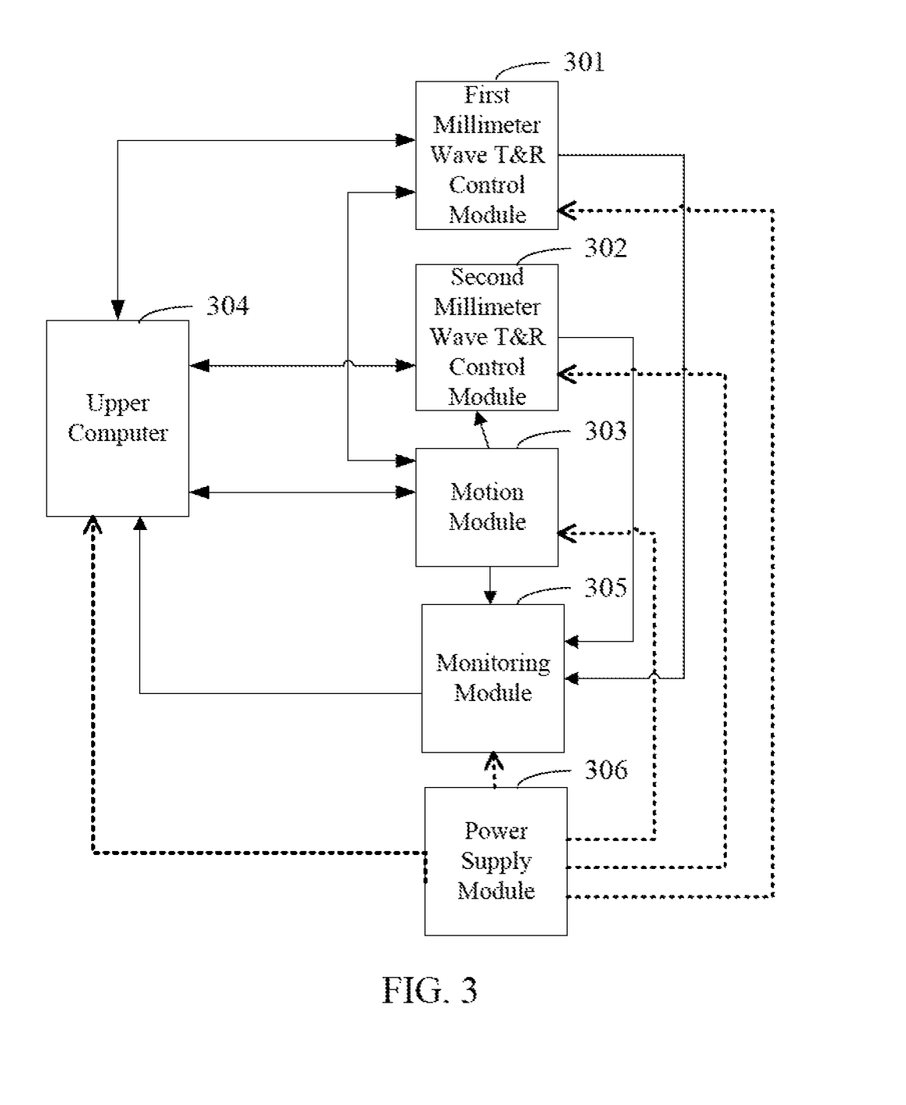
FIG. 3 is a schematic view of a control device for a human-body security-inspection device according to a third embodiment of the present disclosure.

Based on the monitoring method and the monitoring system for the human-body security-inspection device of the above embodiments, the present disclosure further provides a control device for a human-body security-inspection device in accordance with a third embodiment thereof. Referring to FIG. 3, a schematic view of the control device for the human-body security-inspection device according to the third embodiment of the present disclosure is depicted.

As shown in FIG. 3, the control device for the human-body security-inspection device according to the third embodiment of the present disclosure includes a first millimeter-wave receiving and transmitting control module 301, a second millimeter-wave receiving and transmitting control module 302, a motion module 303, an upper computer 304, and a monitoring module 305. The upper computer 304 is connected to the first millimeter-wave receiving and transmitting control module 301, the second millimeter-wave receiving and transmitting control module 302, the motion module 303, and the monitoring module 305 respectively. The monitoring module 305 is further connected to the first millimeter-wave receiving and transmitting control module 301, the second millimeter-wave receiving and transmitting control module 302, and the motion module 303 respectively.

The monitoring module 305 is configured to, after the first millimeter-wave receiving and transmitting control module 301, the second millimeter-wave receiving and transmitting control module 302 and the motion module 303 receives control signals sent from the upper computer 304, respectively collect operation parameters of preset monitoring points in the first millimeter-wave receiving and transmitting control module 301, the second millimeter-wave receiving and transmitting control module 302 and the motion module 303; respectively obtain parameter ranges associated with a module identifier of the first millimeter-wave receiving and transmitting control module 301 and monitoring-point identifiers of the preset monitoring points of the first millimeter-wave receiving and transmitting control module 301, parameter ranges associated with a module identifier of the second millimeter-wave receiving and transmitting control module 302 and monitoring-point identifiers of the preset monitoring points of the second millimeter-wave receiving and transmitting control module 302, parameter ranges associated with a module identifier of the motion module 303 and monitoring-point identifiers of the preset monitoring points of the motion module 303; and respectively determine whether each of the operation parameters is in a corresponding parameter range, and then determine location information of a fault point according to the module identifiers and the monitoring-point identifiers if any of the operation parameters is not in a corresponding parameter range.

In an embodiment as shown in FIG. 3, the control device for the human-body security-inspection device may further include a power-supply module 306. The power-supply module 306 is connected to the first millimeter-wave receiving and transmitting control module 301, the second millimeter-wave receiving and transmitting control module 302, the motion module 303, the upper computer 304, and the monitoring module 305 respectively, for supplying the power to the first millimeter-wave receiving and transmitting control module 301, the second millimeter-wave receiving and transmitting control module 302, the motion module 303, the upper computer 304, and the monitoring module 305.

The monitoring module 305 is further configured to, collect operation parameters of preset monitoring points in the power-supply module 306; obtain parameter ranges associated with a module identifier of the power-supply module 306 and monitoring-point identifiers of preset monitoring points in the power-supply module 306, and determine whether the obtained operation parameters of the preset monitoring points in the power-supply module 306 are within the corresponding parameter ranges respectively, and determine location information of a fault point according to the module identifier of the power-supply module 306 and the monitoring-point identifiers of the preset monitoring points in the power-supply module 306 if any of the obtained operation parameters of the preset monitoring points in the power-supply module is not within a corresponding parameter range.

When the human-body security-inspection device works, the power-supply module 306 supplies the power to the first millimeter-wave receiving and transmitting control module 301, the second millimeter-wave receiving and transmitting control module 302, the motion module 303, the upper computer 304, and the monitoring module 305. The upper computer 304 sends out the instructions to the first millimeter-wave receiving and transmitting control module 301, the second millimeter-wave receiving and transmitting control module 302, the motion module 303 and the monitoring module 305, such that the motion module 303 drives the first millimeter-wave receiving and transmitting control module 301 and the second millimeter-wave receiving and transmitting control module 302 to perform a rotating scan along a 120-degree cylinder surface respectively. When be rotated with a certain angle (such as, about 0.5 degrees), the motion module 303 sends out angle-incremental pulse signals to the first millimeter-wave receiving and transmitting control module 301 and the second millimeter-wave receiving and transmitting control module 302, thus simultaneously, the first millimeter-wave receiving and transmitting control module 301 and the second millimeter-wave receiving and transmitting control module 302 emit millimeter-wave signals to irradiate a human body, then the millimeter-wave signals are reflected by the human body and collected by the first millimeter-wave receiving and transmitting control module 301 and the second millimeter-wave receiving and transmitting control module 302, and data (where are derived from the millimeter-wave signal reflected by the human body) are transmitted to the upper computer 304, such that the upper computer 304 performs three-dimensional imaging calculation for the millimeter-wave data and displays. The monitoring module 305 constantly monitors the operating statuses of the first millimeter-wave receiving and transmitting control module 301, the second millimeter-wave receiving and transmitting control module 302, the motion module 303, the upper computer 304 and the power-supply module 306, such that the monitoring module 305 may obtain location information of a fault point in time, and transmits the location information of the fault point to the upper computer 304 if obtaining the location information of the fault point.

Figure 4:
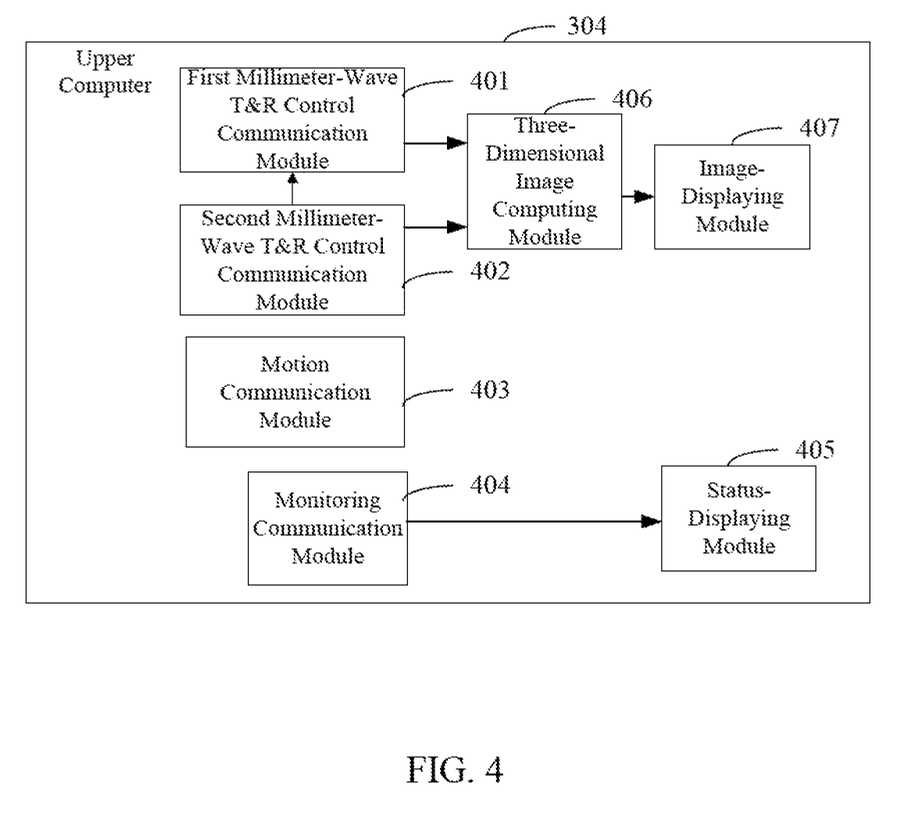
FIG. 4 is a schematic view of a detailed structure of an upper computer as show in FIG. 3 according to an embodiment of the present disclosure.

Referring to FIG. 4, a schematic view of a detailed structure of a upper computer as shown FIG. 3 according to an embodiment of the present disclosure is depicted. In one embodiment, as shown in FIG. 4, the upper computer 304 may include a first millimeter-wave receiving and transmitting control communication module 401, a second millimeter-wave receiving and transmitting control communication module 402, a motion communication module 403, a monitoring communication module 404, a status-displaying module 405, a three-dimensional image computing module 406, and an image-displaying module 407. The first millimeter-wave receiving and transmitting control communication module 401, the second millimeter-wave receiving and transmitting control communication module 402 and the image-displaying module 407 are respectively connected to the three-dimensional image computing module 406. The status-displaying module 405 is connected to the monitoring communication module 404.

In which, the first millimeter-wave receiving and transmitting control communication module 401 is configured to implement the communication between the upper computer 304 and the first millimeter-wave receiving and transmitting control module 301. The second millimeter-wave receiving and transmitting control communication module 402 is used to implement the communication between the upper computer 304 and the second millimeter-wave receiving and transmitting control module 302. The motion communication module 403 is configured to implement the communication between the upper computer 304 and the motion module 303. The monitoring communication module 404 is configured to implement the communication between the upper computer 304 and the monitoring module 305.

In which, the three-dimensional image computing module 406 may adopt a conventional three-dimensional image computing method, which will not be described herein. The image-displaying module 407 is configured to display a computing result from the three-dimensional image computing module 406. The status-displaying module 405 is configured to display the operation parameters or the location information of the fault point, which are obtained by the monitoring module 305.

In addition, as shown in FIG. 4, the upper computer 304 may further include a first power-supply interface 409.

Figure 5:
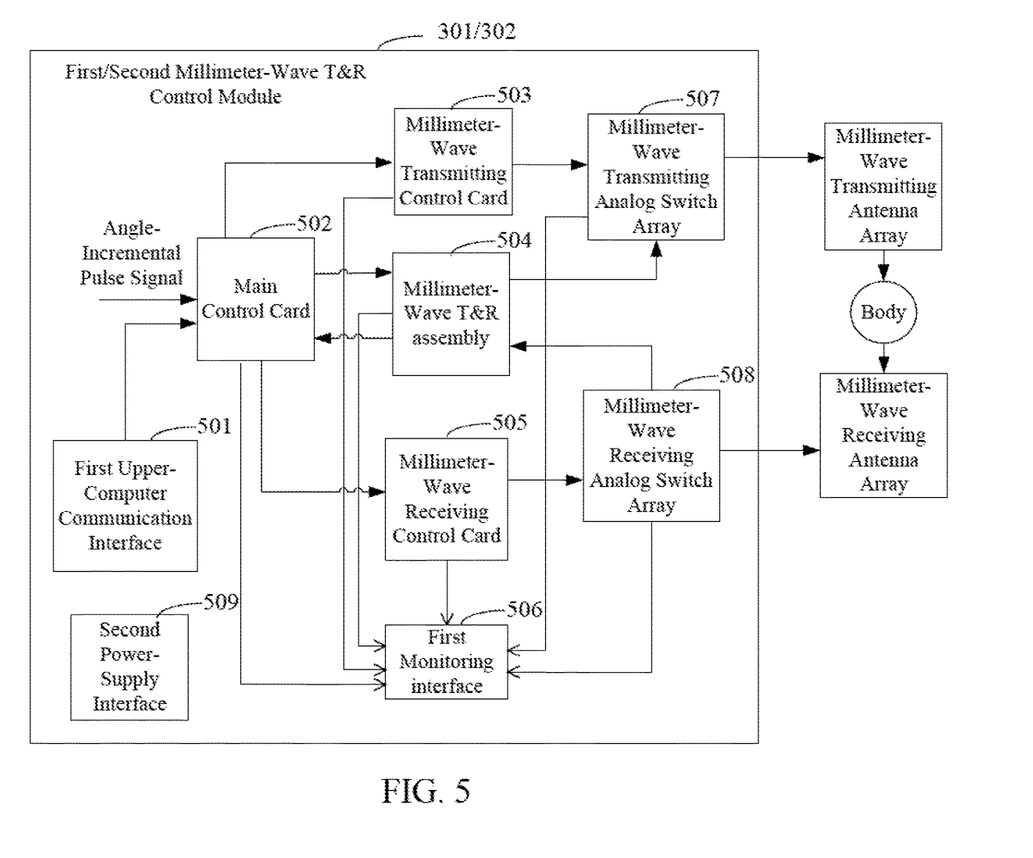
FIG. 5 is a schematic view of a detailed structure of a first millimeter-wave receiving and transmitting control module or a second millimeter-wave receiving and transmitting control module as shown in FIG. 3 according to an embodiment of the present disclosure.

Referring to FIG. 5, a schematic view of a detailed structure of a first millimeter wave receiving and transmitting control module or a second millimeter-wave receiving and transmitting control module as shown in FIG. 3 according to an embodiment of the present disclosure is depicted. In one embodiment, as shown in FIG. 5, each of the first millimeter-wave receiving and transmitting control module 301 and the second millimeter-wave receiving and transmitting control module 302 includes a first upper-computer communication interface 501, a main control card 502, a millimeter-wave transmitting control card 503, a millimeter-wave receiving and transmitting assembly 504, a millimeter-wave receiving control card 505, a first monitoring interface 506, a millimeter-wave transmitting analog switch array 507, and a millimeter wave receiving analog switch array 508. The main control card 502 is connected to the first upper-computer communication interface 501, the millimeter-wave transmitting control card 503, the millimeter wave receiving control card 505 and the millimeter wave receiving and transmitting assembly 504 respectively. The millimeter-wave transmitting analog switch array 507 is connected to a millimeter-wave transmitting antenna array, the millimeter-wave receiving and transmitting assembly 504 and the millimeter-wave transmitting control card 503 respectively. The millimeter-wave receiving analog switch array 508 is connected to a millimeter-wave receiving antenna array, the millimeter-wave receiving and transmitting assembly 504, and the millimeter-wave receiving control card 505 respectively. The first upper-computer communication interface 501 is connected to the main control card 502. The first monitoring interface 506 is connected to the main control card 502, the millimeter-wave transmitting control card 503, the millimeter-wave receiving and transmitting assembly 504, the millimeter-wave receiving control card 505, the millimeter-wave transmitting analog switch array 507, and the millimeter wave receiving analog switch array 508 respectively.

In which, the main control card 502, the millimeter-wave transmitting control card 503, the millimeter-wave receiving and transmitting assembly 504, the millimeter-wave receiving control card 505, the millimeter-wave transmitting analog switch array 507, and the millimeter-wave receiving analog switch array 508, which are connected to the first monitoring interface 506, are used as monitored objects in the first millimeter-wave receiving and transmitting control module 301 and/or the second millimeter-wave receiving and transmitting control module 302, that is, the above-mentioned preset monitoring points.

In order to save the hardware cost, in one embodiment, the first millimeter-wave receiving and transmitting control module 301 and the second millimeter-wave receiving and transmitting control module 302 may share the same first upper-computer communication interface 501, the same main control card 502, and the same millimeter-wave transmitting control card 503, the same millimeter-wave receiving and transmitting assembly 504 and the same millimeter-wave receiving control card 505.

Furthermore, as shown in FIG. 5, each of the first millimeter-wave receiving and transmitting control module 301 and the second millimeter-wave receiving and transmitting control module 302, may further include a second power-supply interface 509.

Specifically, the main control card 502 may adopt a FPGA, DSP, or ARM chip as a CPU thereof, and the main control card 502 is communicated with the millimeter-wave transmitting control card 503 or the millimeter-wave receiving control card 505 by means of the RS485 communication or the direct digital communication. The main control card 502 may control the scanning frequency of the millimeter-wave receiving and transmitting assembly 504 in a range (e.g., 20 GHz-30 GHz), that is, it may be controlled by a VCO (voltage-controlled oscillation source) controlling means which a high-speed D/A chip with 14 bits (or more). The main control card 502 further controls the transmit power of the millimeter-wave transmitting antenna array. Radio-frequency signals received by the millimeter-wave receiving antenna array are down-converted to intermediate-frequency signals by the millimeter-wave receiving and transmitting assembly 504, then are I/Q demodulated and amplified, and finally collected by the high-speed high-bandwidth D/A chip with 14 bits.

The millimeter-wave receiving and transmitting assembly 504 performs the operation, such as, generating the millimeter-wave scanning signals (e.g., 20 GHz-30 GHz), IQ modulating and power amplify the millimeter-wave scanning signals, converts the received millimeter-wave signals into intermediate-frequency signals, and transmits the converted intermediate-frequency signals to the main control card 502.

The millimeter-wave transmitting control card 503 and the millimeter-wave receiving control card 505 may adopt a programmable device, such as CPLD, FPGA, ARM, and DSP, as a CPU to achieve the communication with the main control card 502 and time-gating control the millimeter-wave transmitting analog switch array 507 and the millimeter-wave receiving analog switch array 508.

The millimeter-wave transmitting analog switch array 507 may be consisted of 12 pieces of SP (single-pole) 16T (throw) RF (radio frequency) switches and 2 pieces of SP 12T RF switches.

The millimeter-wave receiving analog switch array 508 may be consisted of 12 pieces of SP 16T RF switches and 2 pieces of SP 12T RF switches. Since it needs to receive the weak millimeter-wave signals, thus the millimeter-wave receiving analog switch array 508 generally further includes a low-noise operational amplifier so as to amplify the signals.

The millimeter-wave transmitting antenna array generally includes at least 192 millimeter-wave antennas, and the millimeter wave receiving antenna array generally includes at least 192 millimeter-wave antennas.

Figure 6:
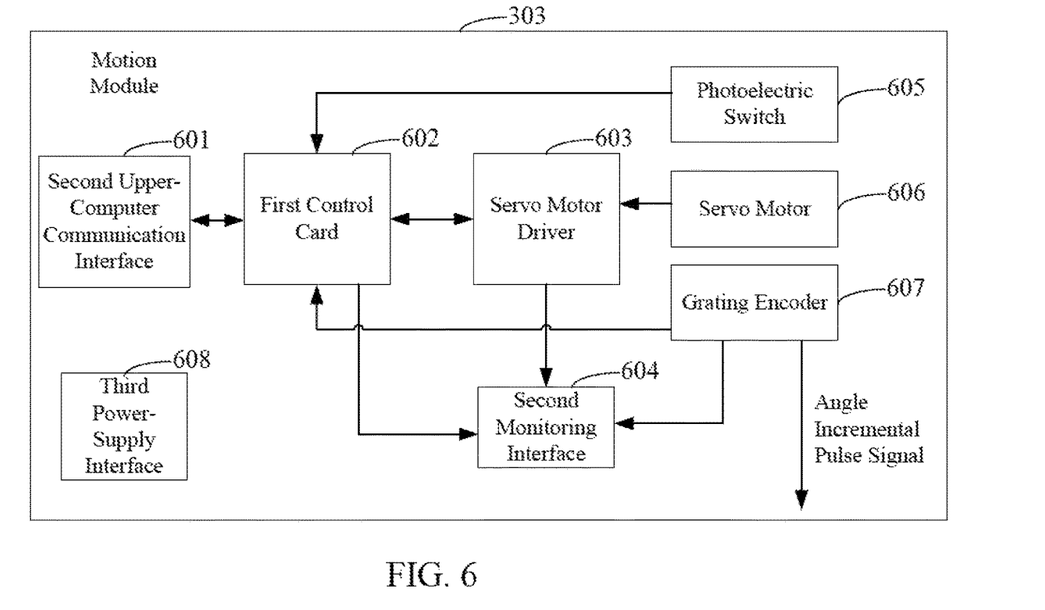
FIG. 6 is a schematic view of a detailed structure of a motion module as shown in FIG. 3 according to an embodiment of the present disclosure.

Referring to FIG. 6, a schematic view of a detailed structure of a motion module as shown in FIG. 3 according to an embodiment of the present disclosure is depicted. In one embodiment, as shown in FIG. 6, the motion module 303 includes a second upper-computer communication interface 601, a first control card 602, a servo motor driver 603, a second monitoring interface 604, a photoelectric switch 605, a servo motor 606, and a grating encoder 607. The first control card 602 is connected to the second upper-computer communication interface 601, the servo motor driver 603, the photoelectric switch 605 and the grating encoder 607 respectively. The servo motor 606 is connected to the servo motor driver 603, and the second monitoring interface 604 is connected to the first control card 602, the servo motor driver 603 and the grating encoder 607 respectively.

In which, the first control card 602, the servo motor driver 603, and the grating encoder 607, which are connected to the second monitoring interface 604, are monitored objects in the motion module 303, that is, the above-mentioned preset monitoring points.

In addition, as shown in FIG. 6, the motion module 303 may further include a third power-supply interface 608.

Specifically, the third power-supply interface 608 is configured to provide the power to the motion module 303. When the human-body security-inspection device works, the first control card 602 receives the instruction from the upper computer 304 via the second upper-computer communication interface 601, and controls the servo motor driver 603 to drive the servo motor 606 to rotate. The grating encoder 607 constantly feeds back rotation angle information of the motor to the first control card 602, and simultaneously transmits the angle-incremental pulse signals to the first millimeter-wave receiving and transmitting control module 301 and the second millimeter-wave receiving and transmitting control module 302, so as to simultaneously emit and collect the millimeter-wave signals. The second monitoring interface 604 transmits the status information of each component in the motion module 303 to the monitoring module 305. The photoelectric switch 605 is configured to monitor the left/right extreme position of rotating the servo motor 606, and locate a starting position of the servo motor 606 in time while the human-body security-inspection device is powered on.

The first control card 602 generally adopt a PLC-control device, and alternatively, it also may adopt a programmable device, such as CPLD, FPGA, ARM, DSP, as a CPU to communicate with the upper computer 301, and the communication method may be USB, LAN, PCI, RS232, RS485, and the like.

Figure 7:
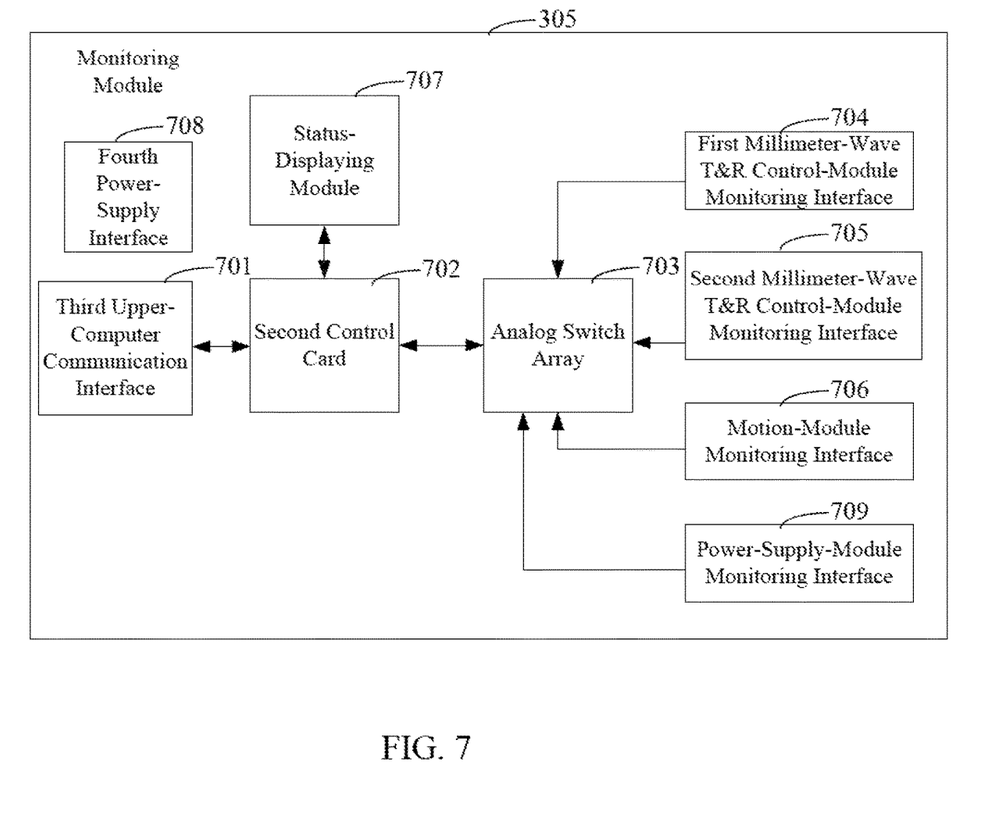
FIG. 7 is a schematic view of a detailed structure of a monitoring module as shown in FIG. 3 according to an embodiment of the present disclosure.

Referring to FIG. 7, a schematic view of a detailed structure of a monitoring module as shown in FIG. 3 according to an embodiment of the present disclosure is depicted. In one embodiment, as shown in FIG. 7, the monitoring module 305 may include a third upper-computer communication interface 701, a second control card 702, and an analog switch array 703 which are connected in series, and further include a first millimeter-wave receiving and transmitting control-module monitoring interface 704, a second millimeter-wave receiving and transmitting control-module monitoring interface 705, and a motion-module monitoring interface 706 which are respectively connected to the analog switch array 703.

Furthermore, as shown in FIG. 7, the monitoring module 305 may further includes at least one of a status-displaying module 707, a fourth power-supply interface 708, and a power-supply-module monitoring interface 709.

Specifically, when the human-body security-inspection device works, the second control card 702 receives the instruction sent from the upper computer 304 via the third upper-computer communication interface 701, and controls the analog switch array 703 to turn on the first millimeter-wave receiving and transmitting control-module monitoring interface 704, the second millimeter-wave receiving and transmitting control-module monitoring interface 705 and the motion-module monitoring interface in series or in a preset sequence for monitoring the information of the operation parameters of the first millimeter-wave receiving and transmitting control module 301, the second millimeter-wave receiving and transmitting control module 302 and the motion module 303. If any one of the operation parameters is not within a corresponding parameter range, the second control card 702 determines the location information of the fault point, transmits the location information of the fault point to the status-displaying module 707 for displaying, and simultaneously, sends the location information of the fault point to the upper computer 304 via the third upper-computer communication interface 701.

The analog switch array 703 is consisted of a plurality of low-frequency analog switches.

The status-displaying module 707 may use LED lights to indicate corresponding statuses of the monitoring points respectively, and alternatively, it also may an 8-bit LED digital tube, or a display screen to display corresponding codes of fault points.

Figure 8:
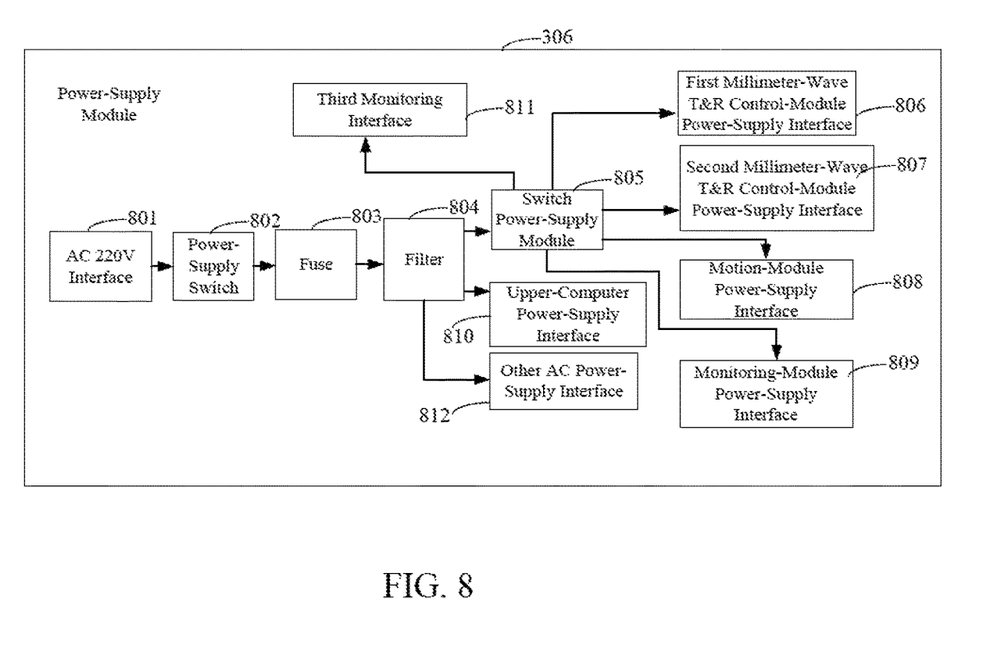
FIG. 8 is a schematic diagram of a detailed structure of a power-supply module as shown in FIG. 3 according to an embodiment of the present disclosure.

Referring to FIG. 8, a schematic view of a detailed structure of a power-supply module as shown in FIG. 3 according to an embodiment of the present disclosure is depicted. In one embodiment, as shown in FIG. 8, the power-supply module 306 may include an AC (alternative current) power-supply interface 801 (e.g., a 220V AC power-supply interface), a power-supply switch 802, a fuse 803, a filter 804, and a switch power-supply module 805 which are connected in series, and may further include a first millimeter-wave receiving and transmitting control-module power-supply interface 806, a second millimeter-wave receiving and transmitting control-module power-supply interface 807, a motion-module power-supply interface 808, and a monitoring-module power-supply interface 809 which are connected to the switch power-supply module 805. In addition, the power-supply module 306 may further include a upper-computer power-supply interface 810 connected with the filter 805, and a third monitoring interface 811 connected with the switch power-supply module 805. For the actual needs, the power-supply module 306 may further include an other AC power-supply interface 812 arranged therein and configured to provide the power to other AC device, such as a light, cooling fan, or display screen of the human-body security-inspection device.

In which, the switch power-supply module 805 connected with the third monitoring interface 811 is the monitored object in the power-supply module 306, that is, the above-mentioned preset monitoring point.

It should be noted that, the power-supply module 306 as shown in FIG. 8 is justly an example, in fact, it will be easy understood for persons skilled in the art that, the power-supply module may only include parts of the device or modules therein according to the actual needs.

Before the human-body security-inspection device works, the AC current passes through the AC power-supply interface 801, the power-supply switch 802, the fuse 803, the filter 804, and the switch power-supply module 805, to provide the power to the upper computer 304, the first millimeter-wave receiving and transmitting control module 301, the second millimeter-wave receiving and transmitting control module 302, the motion module 303, the monitoring module 305, and other AC devices.

In detailed, the present disclosure may select some or all of the upper computer 304 as shown in FIG. 4, the first millimeter-wave receiving and transmitting control module 301 and/or the second millimeter-wave receiving and transmitting control module 302 as show in FIG. 5, the motion module 303 as shown in FIG. 6, the monitoring module 305 as shown in FIG. 7, and the power-supply module 306 as shown in FIG. 8 to cooperatively work. Alternatively, the present disclosure may only select one of the above-mentioned modules to work. When cooperatively working, the first millimeter-wave receiving and transmitting control-module monitoring interface 704, the second millimeter-wave receiving and transmitting control-module monitoring interface 705, the motion-module monitoring interface 706, and the power-supply-module monitoring interface 709 are connected to the first monitoring interface 506 in the first millimeter-wave receiving and transmitting control module 301, the first monitoring interface 506 in the second millimeter-wave receiving and transmitting control module 302, the second monitoring interface 604, and the third monitoring interface 811 in the power-supply module 306 respectively. The upper-computer power-supply interface 810 is connected to the first power-supply interface 409. The first millimeter-wave receiving and transmitting control-module power-supply interface 806, the second millimeter-wave receiving and transmitting control-module power-supply interface 807, the motion-module power-supply interface 808, and the monitoring-module power-supply interface 809 are connected to the second power-supply interface 509 in the first millimeter-wave receiving and transmitting control module 301, the second power-supply interface 509 in the second millimeter-wave receiving and transmitting control module 302, the third power-supply interface 608, and the fourth power-supply interface 708 respectively.

In a specific implementation, the above-mentioned main control card 505, the first control card 602, and the second control card 702 may be achieved by a programmable control card. The programmable control card may adopt a PLC-control means, and alternatively, it also may adopt a programmable device, such as CPLD, FPGA, ARM, or DSP, as a CPU thereof. The upper computer 304 may be communicated with the first millimeter-wave receiving and transmitting control module 301, the second millimeter-wave receiving and transmitting control module 302, the motion module 303, and the monitoring module 305 by a high-speed communication means, such as USB, LAN, and PCI, etc.

The above-mentioned first millimeter-wave receiving and transmitting control module 301, the second millimeter-wave receiving and transmitting control module 302, the motion module 303, the upper computer 304, the monitoring module 305, and the power-supply module 306 may be independent modules respectively, which are capable of being easy to extend the functions thereof, and being convenient to debug, repair and maintain the human-body security-inspection device, while guaranteeing the performance of the test data.

The monitoring module 305 is an independent module, thus it can constantly closed-loop monitor the first millimeter-wave receiving and transmitting control module 301, the second millimeter-wave receiving and transmitting control module 302, the motion module 303, and the power-supply module 306, without influencing the test effect of the human-body security-inspection device.

The technical features of the above-mentioned embodiments may be combined arbitrarily. To make the description succinct, the present disclosure does not describe all of the possible combinations of the technical features in the above-mentioned embodiments. However, if any combination of these technical features is no contradiction therein, it should be considered that the combination is within the scope of this specification.

The above-mentioned embodiments merely represent several examples of the present disclosure, and the description thereof is more specific and detailed, but it should not be considered as limitations to the scope of the present disclosure. It should be noted that, for those skilled in the art, various variations and improvements may be made without departing from the concept of the present disclosure and are all within the protection scope of the present disclosure.

Therefore, the protection scope of the present disclosure shall be subject to the appended claims.

What is claimed is:

1. A control device for a human-body security-inspection device, comprising: a first millimeter-wave receiving and transmitting control module, a second millimeter-wave receiving and transmitting control module, a motion module and a upper computer, wherein the control device further comprises a monitor circuit, the upper computer is connected to the first millimeter-wave receiving and transmitting control module, the second millimeter-wave receiving and transmitting control module, the motion module and the monitor circuit respectively, and the monitor circuit is further connected to the first millimeter-wave receiving and transmitting control module, the second millimeter-wave receiving and transmitting module and the motion module respectively; and the monitor circuit is configured to, after the first millimeter-wave receiving and transmitting control module, the second millimeter-wave receiving and transmitting control module and the motion module receiving control signals sent from the upper computer, respectively collect operation parameters of preset monitoring points in the first millimeter-wave receiving and transmitting control module, the second millimeter-wave receiving and transmitting control module and the motion module; respectively obtain parameter ranges associated with a module identifier of the first millimeter-wave receiving and transmitting control module and monitoring-point identifiers of the preset monitoring points of the first millimeter-wave receiving and transmitting control module, parameter ranges associated with a module identifier of the second millimeter-wave receiving and transmitting control module and monitoring-point identifiers of the preset monitoring points of the second millimeter-wave receiving and transmitting control module, parameter ranges associated with a module identifier of the motion module and monitoring-point identifiers of the preset monitoring points of the motion module; and respectively determine whether each of the operation parameters is in a corresponding parameter range, and then determine location information of a fault point according to the module identifiers and the monitoring-point identifiers if any of the operation parameters is not in a corresponding parameter range.

2. The control device of claim 1, further comprising: a power-supply module, wherein the power-supply module is connected to the first millimeter-wave receiving and transmitting control module, the second millimeter-wave receiving and transmitting control module, the motion module, the upper computer, and the monitor circuit respectively; and the monitor circuit is further configured to, collect operation parameters of preset monitoring points in the power supply module; obtain parameter ranges associated with a module identifier of the power-supply module and monitoring-point identifiers of the preset monitoring points in the power-supply module, and determine whether the obtained operation parameters of the preset monitoring points in the power-supply module are within the corresponding parameter ranges respectively, and then determine location information of a fault point according to the module identifier of the power-supply module and the monitoring-point identifiers of the preset monitoring points in the power-supply module if any of the obtained operation parameters of the preset monitoring points in the power-supply module is not within a corresponding parameter range.

3. The control device of claim 2, wherein the upper computer comprises a first millimeter-wave receiving and transmitting control communication module, a second millimeter-wave receiving and transmitting control communication module, a motion communication module, a monitoring communication module, a status-displaying module, a three-dimensional image computing module, and an image-displaying module, the first millimeter-wave receiving and transmitting control communication module, the second millimeter-wave receiving and transmitting control communication module and the image-displaying module are connected to the three-dimensional image computing module respectively, and the status-displaying module is connected to the monitoring communication module.

4. The control device of claim 2, wherein each of the first millimeter-wave receiving and transmitting control module and the second millimeter-wave receiving and transmitting control module comprises a first upper-computer communication interface, a main control card, a millimeter-wave transmitting control card, a millimeter-wave receiving and transmitting assembly, a millimeter-wave receiving control card, a first monitoring interface, a millimeter-wave transmitting analog switch array, and a millimeter-wave receiving analog switch array; the main control card is respectively connected to the first upper-computer communication interface, the millimeter-wave transmitting control card, the millimeter-wave receiving and transmitting assembly and the millimeter-wave receiving control card, the millimeter-wave transmitting analog switch array is respectively connected to a millimeter-wave transmitting antenna array, the millimeter-wave receiving and transmitting control assembly and the millimeter-wave transmitting control card, the millimeter-wave receiving analog switch array is respectively connected to a millimeter-wave receiving antenna array, the millimeter-wave receiving and transmitting control assembly and the millimeter-wave receiving card; and the first monitoring interface is respectively connected to the main control card, the millimeter-wave transmitting control card, the millimeter-wave receiving and transmitting assembly, the millimeter-wave receiving control card, the millimeter-wave transmitting analog switch array and the millimeter-wave receiving analog switch array.

5. The control device of claim 2, wherein the motion module comprises a second upper-computer communication interface, a first control card, a servo motor driver, a second monitoring interface, a photoelectric switch, a servo motor and a grating encoder; the first control card is respectively connected to the second upper-computer communication interface, the servo motor driver, the photoelectric switch and the grating encoder; the servo motor is connected to the servo motor driver, and the second monitoring interface is respectively connected to the first control card, the servo motor driver and the grating encoder.

6. The control device of claim 2, wherein the monitor circuit comprises a third upper-computer communication interface, a second control card, an analog switch array which are connected in series, and a first millimeter-wave receiving and transmitting control-module monitoring interface, a second millimeter-wave receiving and transmitting control-module monitoring interface, a motion-module monitoring interface and a power-supply module monitoring interface which are respectively connected to the analog switch array.

7. The control device of claim 2, wherein the power-supply module comprises an AC (alternative current) power-supply interface, a power-supply switch, a fuse assembly, a filter and a switch power-supply module which are connected in series, and the power-supply module further comprises a first millimeter-wave receiving and transmitting control-module power-supply interface, a second millimeter-wave receiving and transmitting control-module power-supply interface, a motion-module power-supply interface, and a monitoring-module power-supply interface which are connected to the switch power-supply module, and the power-supply module further comprise a upper-computer power-supply interface connected to the filter and a third monitoring interface connected to the switch power-supply module.

8. The control device of claim 2, wherein the first millimeter-wave receiving and transmitting control module and the second millimeter-wave receiving and transmitting control module share the same first upper-computer communication interface, the same main control card, the same millimeter-wave transmitting control card, the same millimeter-wave receiving and transmitting assembly and the same millimeter-wave receiving control card.

\* \* \* \* \*